United States Patent
Hirono

(10) Patent No.: US 6,803,956 B1
(45) Date of Patent: Oct. 12, 2004

(54) COLOR RECOGNITION CAMERA

(75) Inventor: Yutaka Hirono, San Jose, CA (US)

(73) Assignee: Pulnix America, Inc., Sunnyvale, CA (US)

(*) Notice: Subject to any disclaimer, the term of this patent is extended or adjusted under 35 U.S.C. 154(b) by 939 days.

(21) Appl. No.: 09/591,990

(22) Filed: Jun. 12, 2000

(51) Int. Cl.$^7$ .............................................. H04N 3/14
(52) U.S. Cl. ...................................................... 348/272
(58) Field of Search ................................ 348/272, 263, 348/649, 655, 651, 223.1, 225.1, 227.1; 358/1.9, 2.1, 518, 515; 382/167, 162, 274

(56) References Cited

U.S. PATENT DOCUMENTS

| | | | | |
|---|---|---|---|---|
| 4,307,962 A | * | 12/1981 | Jung | 356/405 |
| 4,679,067 A | * | 7/1987 | Belmares-Sarabia et al. | 348/655 |
| 5,361,093 A | * | 11/1994 | Yamamoto et al. | 348/223.1 |
| 5,548,697 A | * | 8/1996 | Zortea | 706/2 |
| 5,838,310 A | * | 11/1998 | Uya | 345/536 |
| 6,271,940 B1 | * | 8/2001 | Deschuytere et al. | 358/504 |
| 6,459,449 B1 | * | 10/2002 | Juen | 348/223.1 |
| 2001/0030697 A1 | * | 10/2001 | Dischert et al. | 348/263 |

* cited by examiner

Primary Examiner—Aung Moe
(74) Attorney, Agent, or Firm—Thomas E. Schatzel; Law Offices of Thomas F. Schatzel, A Prof. Corp.

(57) ABSTRACT

A color-recognition camera comprises a red-green-blue CCD-imaging device that provides an analog RGB-video signal. A set of three analog-to-digital converters convert the analog RGB-video signal into a digital RGB-video signal. A digital comparator tests the digital RGB-video signal pixel-by-pixel for a match against a color setpoint. If a match occurs, a pixel with a particular color represented by the color setpoint has been recognized and a "hit" is output. A pixel address counter provides a pixel address output each time a "hit" is registered. The number of hits per video frame are accumulated, and a color-match area magnitude value is output for each frame. Alternatively, neural networks are used to indicate hits when a pixel in the video image comes close enough to the color setpoint value. Just how close can be "learned" by the neural network.

8 Claims, 2 Drawing Sheets

US 6,803,956 B1

COLOR RECOGNITION CAMERA

FIELD OF THE INVENTION

Figure 1:
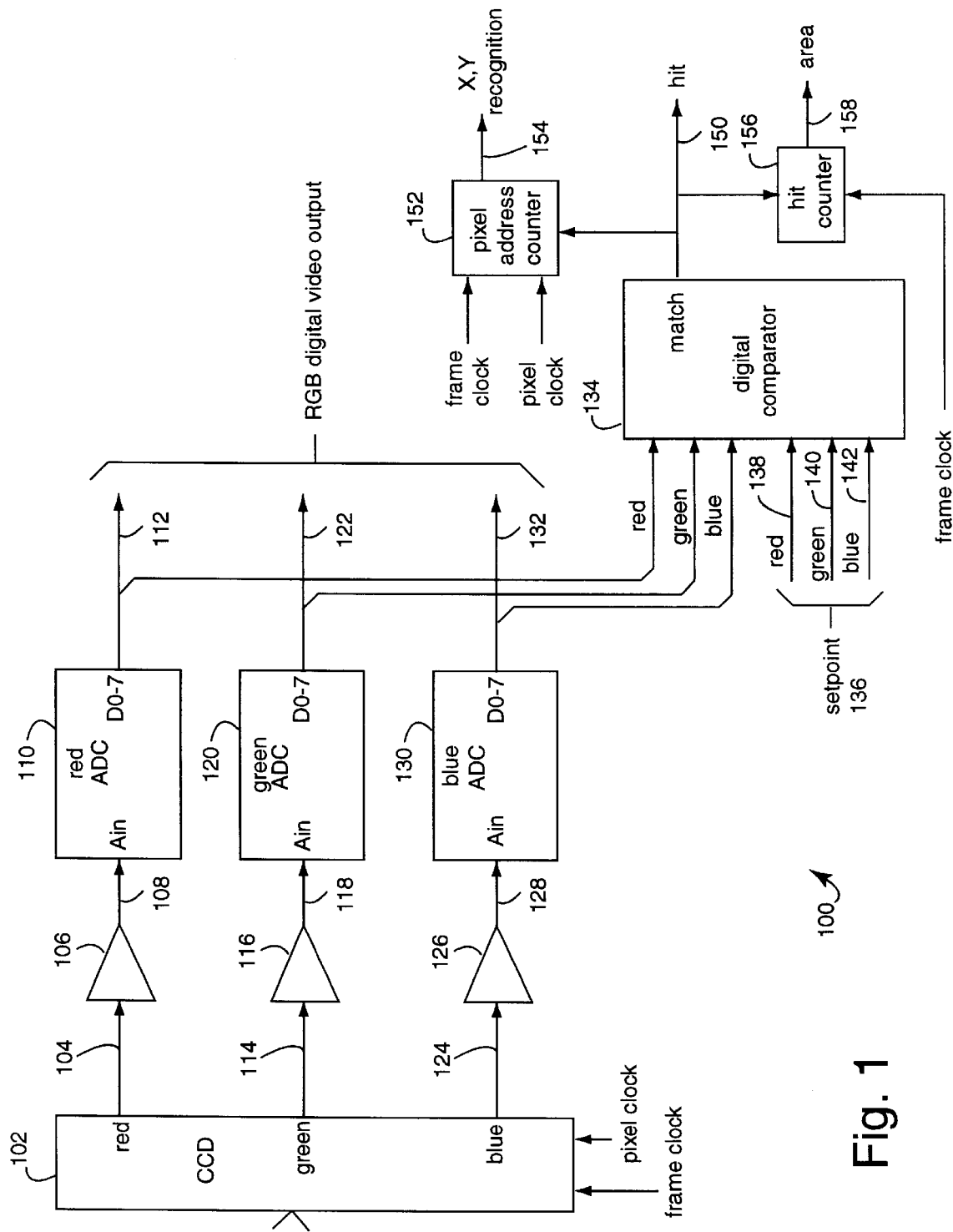

The present invention relates to electronic imaging devices, and more particularly to cameras that can be preconditioned to recognize particular colors when they appear in an image.

DESCRIPTION OF THE PRIOR ART

Color provides important clues and information in video images. For example, a video scan of bananas could indicate if the bananas were ripe (yellow) or unripe (green). In the manufacture of candy, different package colors are used to indicate the candy flavor, e.g., apple (green), orange (orange), grape (purple), cherry (red), etc. So automated systems with color cameras and circuits that can distinguish or recognize particular colors could be used to sort and categorize products.

So, some prior art color sensing systems have included point sensors that are placed at the particular spot a certain color is expected to appear. This, of course, is very limiting. The spot chosen must be right, and the point sensor itself must not interfere with the processes being surveyed. A two-dimensional color recognition system is needed.

SUMMARY OF THE INVENTION

It is therefore an object of the present invention to provide a color-recognition camera that can identify particular colors in a video image.

It is another object of the present invention to provide a color-recognition camera that can judge the geometric area of visible items with particular colors in a video image.

Briefly, a color-recognition camera embodiment of the present invention comprises a red-green-blue CCD-imaging device that provides an analog RGB-video signal. A set of three analog-to-digital converters convert the analog RGB-video signal into a digital RGB-video signal. A digital comparator tests the digital RGB-video signal pixel-by-pixel for a match against a color setpoint. If a match occurs, a pixel with a particular color represented by the color setpoint has been recognized and a "hit" is output. A pixel address counter provides a pixel address output each time a "hit" is registered. The number of hits per video frame are accumulated, and a color-match area magnitude value is output for each frame. Alternatively, neural networks are used to indicate hits when a pixel in the video image comes close enough to the color setpoint value. Just how close can be "learned" by the neural network.

An advantage of the present invention is that a color-recognition camera is provided that can scan two-dimensional areas.

Another advantage of the present invention is that a color-recognition camera is provided that can judge the extent of the area with a recognized color.

These and other objects and advantages of the present invention will no doubt become obvious to those of ordinary skill in the art after having read the following detailed description of the preferred embodiments which are illustrated in the drawing figure.

IN THE DRAWINGS

Figure 2:
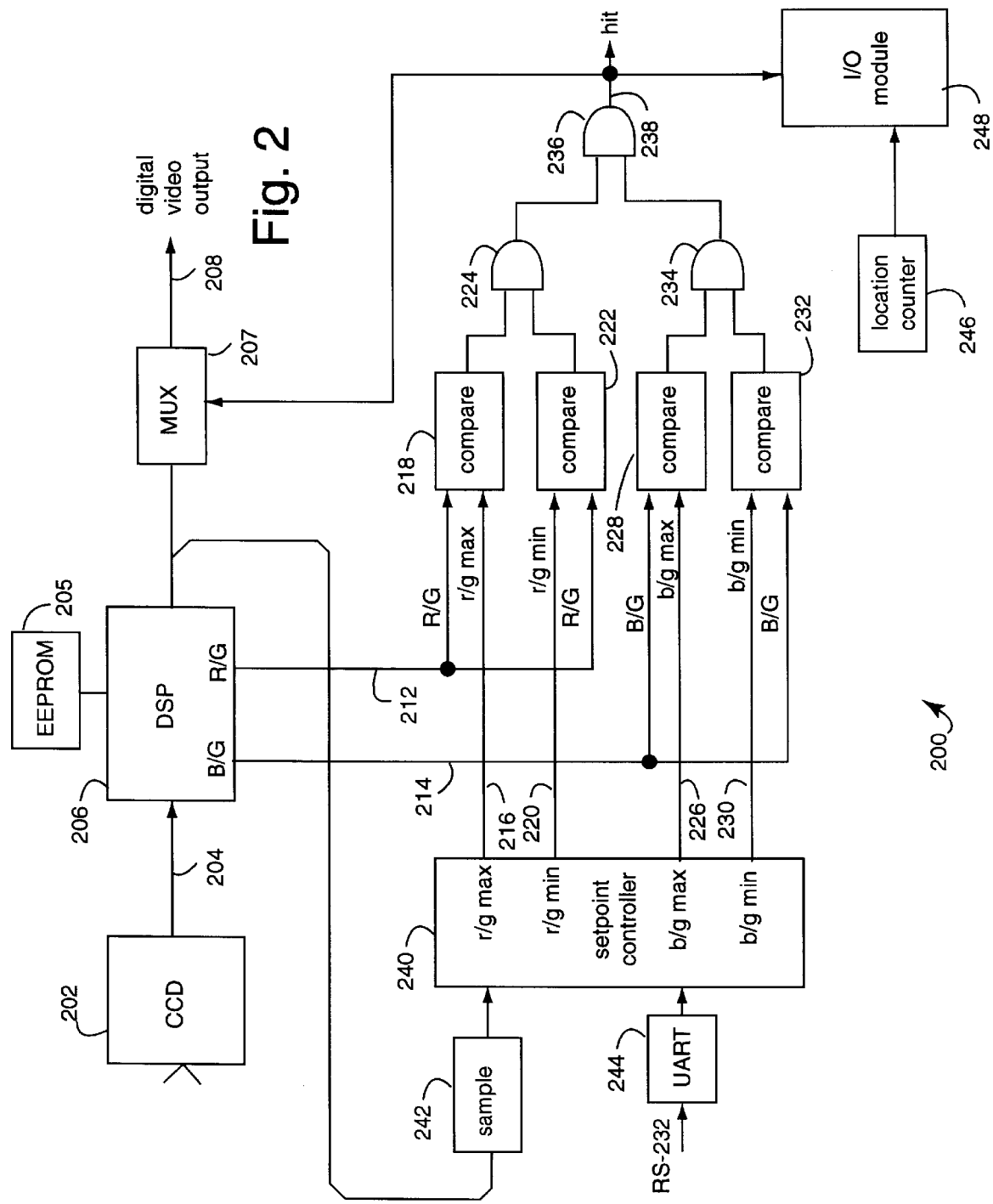

FIG. 1 is a functional block diagram of a color-recognition camera embodiment of the present invention that uses RGB comparisons; and FIG. 2 is a functional block diagram of an exemplary color-recognition camera embodiment of the present invention that uses color-ratio comparisons.

DETAILED DESCRIPTION OF THE PREFERRED EMBODIMENT

A color-recognition camera embodiment of the present invention is illustrated in FIG. 1 and is referred to herein by the general reference numeral 100. The system 100 includes an RGB color CCD-imaging device 102 with a red analog output signal 104 that drives a red amplifier 106. An amplified red analog video signal 108 drives a red analog-to-digital converter (ADC) 110 that produces a red digital video signal 112. Similarly, a green analog output signal 114 drives a green amplifier 116. An amplified green analog video signal 118 drives a green analog-to-digital converter (ADC) 120 that produces a green digital video signal 122. And, a blue analog output signal 124 drives a blue amplifier 126. An amplified blue analog video signal 128 drives a blue analog-to-digital converter (ADC) 130 that produces a blue digital video signal 132.

A comparator 134 simultaneously compares the red-green-blue magnitudes of each of signals 112, 122, and 132, to a setpoint color 136. A constituent setpoint red signal 138 is matched in magnitude to red digital video signal 112, a constituent setpoint green signal 140 is matched in magnitude to green digital video signal 122, and a constituent setpoint blue signal 142 is matched in magnitude to blue digital video signal 132. If all three match their corresponding setpoint values, a "hit" signal 150 is output. A ten-bit binary match is preferred, even though the camera video outputs will typically have a binary resolution of only eight bits.

In alternative embodiments of the present invention, the comparator 134 can be implemented as a digital comparator where the matches must be precisely made, or as a neural network where the color matches need only be "close enough". What is close enough can be "learned" by such neural network where training sessions send through test vectors and the vector values that the neural networks are expected to "fire" on are clocked in to registers.

In some applications it will be important to know the x,y location in the video image that a color-match "hit" occurred. A pixel-address counter 152 advances an x,y address counter each time a pixel clock occurs. It is reset each video frame by a frame clock. When a "hit" occurs, a recognition address signal 154 is output.

In other applications it will be important to know the extent of the video image that color-matches the color setpoint value. The "hit" signal 150 advances an area-hit counter 156 each time a match occurs. A digital hit-area value signal 158 is output each frame clock. The internal counter is reset for the next frame.

It is possible to modify a conventional color camera to provide the benefits of the present invention. For example, Pulnix America (Sunnyvale, Calif.) makes several models that provide excellent results, e.g., model TMC-1000 for 1 K-by-1 K resolution at fifteen frames-per-second (fps), and TMC-6700 for 640-by-480 resolution at sixty fps.

Typical conventional cameras use digital signal processors (DSP) for much of the internal circuitry. The programming of such DSPs can be modified to provide much, if not all, of the functionality required by embodiments of the present invention.

FIG. 2 illustrates a color-recognition camera system embodiment of the present invention such as could be built on a conventional-camera base, and is referred to herein by the general reference numeral 200. The color-recognition camera system 200 comprises a CCD-imaging device 202 that produces a color video signal 204. An electrically erasable programmable read-only memory (EEPROM) 205 provides program and data storage for a digital signal processor (DSP) 206. A multiplexer (MUX) 207 outputs a digital video output signal 208 calculated by the DSP 206. Such may include "hit" and location information. The DSP 206 computes and outputs the ratio of the red to the green for each pixel in an R/G output signal 212, and outputs the ratio of the blue to the green for each pixel in a B/G output signal 214.

The MUX 207 may convert RGB-video signals to processed video depending on the state of the hit-signal 238.

A maximum red-to-green ratio setpoint 216 is provided to a maximum R/G magnitude comparator 218. A minimum red-to-green ratio setpoint 220 is provided to a minimum R/G magnitude comparator 222. An AND-gate 224 produces a TRUE output when the R/G output signal 212 is between the values represented by the maximum red-to-green ratio setpoint 216 and the minimum red-to-green ratio setpoint 220.

A maximum blue-to-green ratio setpoint 226 is provided to a maximum B/G magnitude comparator 228. A minimum blue-to-green ratio setpoint 230 is provided to a minimum B/G magnitude comparator 232. An AND-gate 234 produces a TRUE output when the B/G signal 214 is between the values represented by the maximum blue-to-green ratio setpoint 226 and the minimum blue-to-green ratio setpoint 230.

An AND-gate 236 produces a "hit" signal 238 when both the outputs of AND-gates 224 and 234 are true. Therefore, the "hit" signal 238 is TRUE when a pixel being imaged by the CCD-imaging device 202 matches a color setpoint within an acceptable range. Both such color setpoint and the acceptable range are provided as four discrete signals 216, 220, 226, and 230, from a setpoint controller 240.

The color setpoint controller 240 either allows an internal color specification to be internally registered through a sampler 242, or an external color specification to be externally registered through a serial communication channel to a universal asynchronous receiver-transmitter (UART) 244. For example, if the camera 200 has its field-of-view flooded with a color that is to be recognized, the sampler 242 can be triggered to copy the resulting RGB values in.

A location counter 246 keeps track of the current video scan position and provides such information to an input/output module 246 for use in external recognition-controlled devices. The camera system 200 may be used in a completely stand-alone application, and does not depend on external equipment. For example, the I/O module 246 preferably allows the interactive entry and display of color setpoint, location, and size information with a user.

The color-ratio value comparisons illustrated in FIG. 2 can be implemented with conventional digital or analog circuits and techniques.

In alternative embodiments of the present invention, a cursor can be manipulated on a display screen included in the I/O module 248. A sample-select button is preferably provided that allows the color setpoint controller 240 to be automatically set to detect the color being pointed to by the user. Operational modes preferably include frame-by-frame color comparisons, and also sample-and-hold. The I/O module 248 may be implemented with an open-collector output that can trigger factory-floor equipment directly. In such situations, no supporting computer system is needed to setup or support the camera system 200.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A color-recognition system, comprising:
   an input for a multichannel primary-color camera video signal that represents color hues by the signal magnitudes in each respective channel;
   a color setpoint controller for generating color setpoint values of multichannel signal magnitudes at a color setpoint output to electronically represent particular color hues; and
   a comparator connected to compare signal magnitudes on the multichannel primary-color camera signal input with corresponding ones on said color setpoint output, and that generates a match signal output when they substantially match, wherein, a pixel-by-pixel test is made for a match against a color setpoint that produces an "hit" indication at a system output;
   an address counter for determining and outputting a two-dimensional X,Y position of each pixel in a frame of the camera video signal input that produce a "hit" indication; and
   a hit counter for accumulating and outputting the number of pixels in a frame of the camera video signal input that produce said "hit" indication.

2. The system of claim 1, further comprising:
   a digital register included in the setpoint controller that stores a minimum and a maximum value so that a range of color hues may be matched by the comparator; and
   a digital-to-analog converter (ADC) connected to convert an analog video signal from said video imaging device to a digital video signal that is provided to the comparator as said second value.

3. The system of claim 1, further comprising:
   a digital register included in the setpoint controller that stores a minimum and a maximum value for each of red, green, and blue so that a range of composite color variations may be matched by the comparator.

4. The system of claim 1, further comprising:
   a plurality of analog-to-digital converters (ADC) one for each of red, green, and blue connected to convert a color analog video signal from said video imaging device to an RGB digital video signal that is provided as three magnitudes to the comparator.

5. A color-recognition system, comprising:
   a CCD-imaging device for providing a color analog video image of its field-of-view;
   a digital signal processor (DSP) connected to the CCD-imaging device and able to process a digital video output that represents said color analog video image;
   a circuit within the DSP for providing a red-green ratio signal and a blue-green ratio signal derived from said color analog video image;
   a red-green maximum comparator for determining if said red-green ratio signal is less than a red-green maximum signal;

a red-green minimum comparator for determining if said red-green ratio signal exceeds a red-green minimum signal;

a blue-green maximum comparator for determining if said blue-green ratio signal is less than a blue-green maximum signal;

a blue-green minimum comparator for determining if said blue-green ratio signal exceeds a blue-green minimum signal; and a logic circuit connected to each of the red-green maximum and minimum comparators, and connected to each of the blue-green maximum and minimum comparators, and further providing for a color "hit" signal output whenever a pixel within said color analog video image falls within a predetermined color range.

6. The system of claim 5, further comprising:

a setpoint controller connected to provide each of said red-green maximum and minimum signals, and also said blue-green maximum and minimum signals.

7. The system of claim 5, further comprising:

a sampler connected to receive a signal derived from said color analog video image, and to provide an internal color-sample setpoint to the setpoint controller.

8. The system of claim 5, further comprising:

a serial communications receiver connected to receive and register a color-value specification to the setpoint controller.

* * * * *